United States Patent Office 3,262,799
Patented July 26, 1966

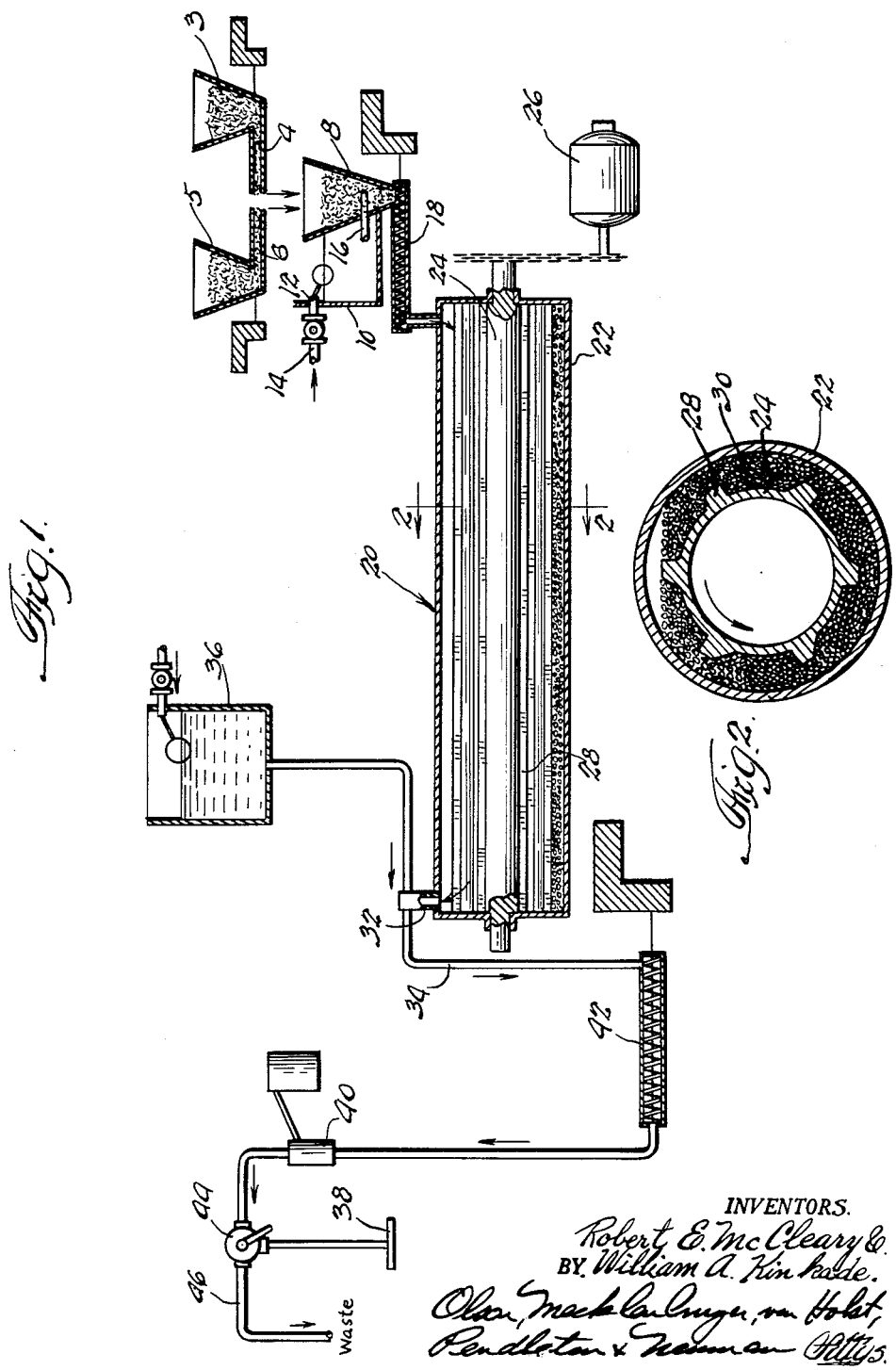

3,262,799
METHOD FOR MAKING ULTRAFINE CALCIUM
SULFATE DIHYDRATE CRYSTALS
Robert E. McCleary, Geneva, Ill., and William A. Kinkade, El Paso, Tex., assignors to United States Gypsum Company, Chicago, Ill., a corporation of Illinois
Filed Aug. 1, 1960, Ser. No. 50,816
3 Claims. (Cl. 106—110)

This invention relates to a method for making ultrafine calcium sulfate dihydrate crystals. This invention more particularly relates to the production of ultrafine crystals of calcium sulfate dihydrate in aqueous suspension, especially adaptable as an accelerator to hasten the setting process of plaster of Paris, commonly known as stucco by those skilled in the art.

The time within which a slurry of calcined gypsum can be made to set has always played a large part in mechanization of the process of manufacture of fabricated gypsum products. Many attempts have been made to provide a low cost, efficient accelerator that could be added to a slurry of calcined gypsum to cause the slurry to set within a period of a few minutes. The normal set time within which a slurry will solidify without an accelerator is known to be in the order of 40 minutes; thus attempts have been made to reduce the normal setting time to speed up manufacturing processes. It is well known that various chemical compound additives will substantially reduce the set time of calcined gypsum slurry, and some of the more common compounds now used to reduce the setting time are potassium sulfate, ammonium sulfate, and finely ground calcium sulfate dihydrate among others. These compounds, though efficient by themselves in reducing the set time, are many times too uneconomical to be practical.

Generally, in the gypsum industry, the most economical and practical method of speeding the set time of a slurry of calcined gypsum, prior to this invention, was of add finely dry-ground crystalline calcium sulfate dihydrate to the slurry. The calcium sulfate dihydrate acts to initiate the rehydration of the hemihydrate in the slurry, and the most economical method of obtaining the calcium sulfate dihydrate prior to this invention was by grinding a block or cast of set gypsum. Frequently a supplementary portion of a chemical additive accelerator, such as ammonium sulfate or potassium sulfate, etc., before mentioned, was also added to achieve proper setting action. The ground block process left much to be desired for many reasons. Perhaps the primary disadvantage of using ground block process was its predisposition to cause a lack of uniformity in the ultimate set gypsum product. Another disadvantage in using ground block as an accelerator was the tendency of the block to have a certain amount of free water content, since these blocks are often incompletely dried. The free water, of course, made it impossible to obtain efficiency of grinding due to the tendency of the block material to collect on the grinding wheels and "plug" the abrasive surface. Perhaps an even more serious difficulty encountered in the grinding of these blocks was calcination due to the heat of grinding. Samples of the ground calcium sulfate dihydrate often showed up to 30% calcination with consequent loss or variation in potency, and the product was also subject to rapid loss of efficiency when exposed to the atmosphere. Also, this gypsum block grinding process necessitated manual servicing and monitoring by a responsible individual, and this process, therefore, did not lend itself well to automation. This crude manner of providing an accelerator thus left a great deal to be desired.

In view of the disadvantages noted with the use of ground gypsum block as an accelerator, it has long been desired to eliminate the process entirely and this is one of the primary objectives of this invention.

Prior to this invention, attempts were made to provide ultrafine calcium sulfate dihydrate crystals by other processes. Various batch processes were devised including at least one wherein calcium sulfate dihydrate crystals were produced from an aqueous suspension. Such attempts, however, were unsuccessful inasmuch as extremely fine crystals, i.e., below 1 micron in diameter, could not be made thereby, and the crystals produced were not small enough to form a practical setting accelerator for calcined gypsum slurries.

It is very desirable to have the accelerator material in an extremely fine form so that it may be uniformly and efficiently distributed throughout the slurry which is to be set. The finer the material, the greater the efficiency, and therefore, the less material required to set a given quantity of slurry. For mechanization it is, of course, also desirable that the accelerator production process be continuous.

Therefore, one of the primary objects of this invention is to provide a method of making a highly potent, efficient and economical accelerator for unset calcined gypsum slurry.

Another object is to provide a method of making an accelerator that will more uniformly set a gypsum product than any accelerator heretofore provided.

Another object is to provide a method for promoting the rate of nucleation and for controlling subsequent crystal growth of ultrafine calcium sulfate dihydrate crystals in an aqueous medium initially containing calcium sulfate hemihydrate.

Another object is to provide a continuous method for the production of ultrafine calcium sulfate dihydrate crystals.

Another object is to provide a method of accelerating the setting action of an aqueous slurry in which calcined gypsum is the major component, which method requires less attention and monitoring than any method heretofore devised.

Another object is to provide ultrafine calcium sulfate dihydrate crystals that may be used as a filler for inks, plastics, paints, pigments, pharmaceuticals, insecticides, etc.

Further objects and advantages will become obvious to those skilled in the art upon reading the following detailed description and claims in connection with the accompanying drawings.

In accordance with this invention, a method is provided for the continuous production of fine calcium sulfate dihydrate crystals. This method may be described as comprising the following steps: first, a quantity of stucco is provided (stucco being predominantly hemihydrate of calcium sulfate); to this stucco is added in excess of 10 parts of water which is substantially more than that amount of water required for rehydration of the calcium sulfate hemihydrate to the calcium sulfate dihydrate. This dilute aqueous suspension comprised of stucco is passed through a chamber wherein it is minutely divided and agitated in such a manner as to promote the rate of nucleation and control the growth of ultrafine crystals of calcium sulfate dihydrate.

The nucleated crystals when produced in accordance with this invention and subsequently added to an aqueous slurry of unset calcined gypsum, act as an extremely effective set accelerator. A set accelerator made by the method herein described is more economical and efficient than any other accelerator heretofore provided, and the ultrafine crystals made by this method have a very large available surface area per unit weight; thus a lesser amount of accelerator is needed for setting a given quantity of gypsum slurry within a given time.

In the drawings:

FIGURE 1 is a diagram of the process of this invention and includes an elevational view of the crystal nucleating apparatus; and FIG. 2 is an enlarged sectional elevation view of a portion of the crystal nucleating apparatus, taken substantially along line 2—2 of FIG. 1.

Referring now more particularly to the drawings, FIG. 1 is a schematic illustration of the process showing the various mechanisms which may be employed therewith. The process is illustrated in connection with the manufacture of gypsum board, and each mechanism illustrated in the drawings and described herein is but one of many such mechanisms that may be utilized effectively in practicing the invention.

According to the invention, a portion of stucco (plaster of Paris, consisting essentially of the hemihydrate of calcium sulfate) is diverted to a stucco hopper 3. Hopper 3 is provided with a feeder mechanism 4 that causes a constant flow from the bottom of hopper 3. The feeder mechanism 4 may be a screw feeder such as that manufactured by Vibra Screw Feeders, Inc., of Clifton, New Jersey, and it may be equipped with a remote control speed adjustment to enable the operator to control this and other mechanisms used in the wallboard process from a centralized control panel. Adjacent the hopper 3 is situated chemical additive hopper 5, which is designed to contain a quantity of additive such as ammonium sulfate, potassium sulfate, finely ground calcium sulfate dihydrate or other accelerator compounds. The additive hopper 5 is also provided with a feeder mechanism 6, similar to that used on the mechanism 4 on the stucco hopper. The hoppers 3 and 5 are situated so as to permit the feed from the feeder mechanisms 4 and 6 respectively into a mixing receptacle 8. The receptable 8 is preferably conical in shape, and a float level tank 10 may be connected thereto either directly as shown, or by means of a pipe or hose. The float level tank 10 is kept filled by a float valve 12 connected to a pressurized water source 14. A tangential fluid connection 16 is provided between the mixing receptacle 8 and the float level tank 10 near the base of the receptacle 8. This tangential connection provides a circulating vortex of water to keep the interior walls of mixing receptacle 8 clean. This connection from float level tank 10 to mixing receptacle 8 may be varied to provide the most efficient water flow, or if desired, other means, such as a mechanical agitator or rotary scraper blade, may be substituted to prevent accumulations. A metering pump 18 connected to the bottom of the mixing receptacle 8 provides positive and uniform flow of the dilute suspension consisting of hemihydrate, water and, if used, an auxiliary accelerator additive into a nucleating or microcrystallizing apparatus 20.

Apparatus 20 is comprised of an elongate, substantially closed, cylindrical or tubular container 22 having a hollow agitator shaft 24 disposed longitudinally therein for relative rotation with respect thereto. A suitable power means 26 is connected to and effects rotation of the shaft 24 within the container 22. The tubular container 22 is disposed horizontally and is fixed in position, so that the shaft 24 disposed therein rotates relatively thereto. Mounted longitudinally on shaft 24 are a plurality of impeller bars 28 which are circumferentially spaced about the periphery of the shaft 24 and protrude widthwise radially outward from the shaft. As best illustrated in FIG. 2, the preferred embodiment includes six such impeller bars 28, and each bar has its forward or leading face sloping or pitched rearwardly with respect to the direction of shaft rotation. The shaft 24 with the impeller bars 28 attached thereto is adapted to rotate in the direction indicated by the arrow in FIG. 2. It has been found that best results are obtained when the impeller bars 28 protrude radially from the periphery of the shaft 24 a distance which is at least 10% of the diameter of the shaft 24.

The container 22 is substantially filled with steel balls, which are preferably in the order of ½ inch in diameter, and the clearance between the outer extremities of the impeller bars 28 on the rotating shaft 24 and the wall of the surrounding container 22 should be in excess of two ball diameters to prevent binding. Thus, if ½ inch diameter balls are used, this clearance should be at least 1 inch. The number of steel balls within the container 22 is necessarily limited by the size of the container, the space within the container occupied by the shaft 24 and the impeller bars 28 and by the requirement that the shaft and impeller bars must be permitted to rotate within the container after the container has been loaded with balls. It is important to note that the major function of the microcrystallizer is not to grind but rather to divide and agitate, so that the dihydrate crystal nucleation is promoted while the crystal growth is substantially retarded. The result is unusually fine crystals most of which are less than 1 micron in diameter.

The nucleating or microcrystallizing apparatus 20 discharges through its outlet 32 into the water line 34 which conveys water from a gauging water tank 36 to the mixer manifold 38 of a gypsum wallboard making machine. The rate of discharge of the dihydrate suspension from the microcrystallizer is governed by the rate at which the hemihydrate suspension is fed into the microcrystallizer by the metering pump 18. The water from the gauging tank 36 and the suspension from the microcrystallizer 20 are pumped through the line 34 and through an electromagnetic flow meter 40 in that line by means of a positive displacement pump 42. The gauging water line 34 is connected to the gypsum board mixer manifold 38 by means of a three-way valve 44, and a line 46 extends from this three-way valve 44 so that when the valve is in one of its positions, the water and the dilute suspension may pass through the line 34, through the valve 44 and be disposed of through the line 46 which may lead to the drain or sewer. The pump 42 pulls water from the gauging water tank 36 so that the total amount of water from the tank 36 and the microcrystallizer 20 is the amount of water desired to be introduced into the mixer manifold 38. The electromagnetic flow meter 40 serves as a monitor of the water flow rate and indicates the amount of liquid passing through the line 34.

The process for making the ultrafine crystals of calcium sulfate dihydrate and for subsequently making the gypsum slurry is as follows: A portion of stucco is placed in the hopper 3, and a quantity of ancillary accelerator material, such as ammonium sulfate or finely ground calcium sulfate dihydrate, is placed in additive feeder 5. A prescribed quantity of ancillary accelerator material and stucco are fed into mixing receptacle 8 and mixed thoroughly with water prior to being fed into the microcrystallizer 20 by the pump 18. In the microcrystallizer 20 the dilute suspension is minutely divided, and the agitation and impaction of the rotating ball mass within the microcrystallizer induces rapid solution of the calcium sulfate hemihydrate and extensive nucleation of calcium sulfate dihydrate crystals. The action of the balls, the diluteness of the solution, and the fairly rapid rate of flow through the microcrystallizer 20, tend to discourage the joining of the nuclei and tend to minimize the size of the crystals formed. The net result is a large number of tiny crystals of calcium sulfate dihydrate, the majority being below 1 micron in diameter. The suspension of tiny dihydrate crystals thus formed is continuously discharged into water line 34. This suspension is continuously forced into the mixer manifold 38 by the positive displacement pump 42. When the process is initiated, the three-way valve 44 is opened to the waste line 46 and closed to the mixer manifold 38 for a period in the order of five minutes, whch is usually sufficient to completely clear the microcrystallizer 20. This allows the system to achieve equilibrium with the desired concentration of crystals within. The method will be more fully understood by the following example.

The operation of the method is continuous, and it is preferred that the suspension be passed through the microcrystallizer at such a rate that it remains in the microcrystallizer for from three to ten minutes, with about five minutes being preferred. This rate will, of course, depend upon many things including the makeup of the stucco, the amount and type of auxiliary accelerator used, if any, the water used, etc.

*Example 1.*—This is an example of the method of this invention practiced in conjunction with a machine making ½-inch thick, 4-feet wide gypsum board and operating at 104 lineal feet per minutes. Stucco normally used in gypsum board manufacture was continuously fed from the hopper 3 by feeder mechanism 4 which was adjusted to deliver 3.1 pounds per minute of stucco to the wet mixing receptacle 8. Ancillary chemical additive, i.e., ammonium sulfate in this case, was provided in hopper 5 and was continuously fed to mixing receptacle 8 by feeder mechanism 6 at the rate of 0.25 pound per minute. Water at 80° F. was continuously and automatically supplied from float tank 10 through the connection 16 to the mixing receptacle 8 at the rate of 108 pounds per minute. The water, additive, and stucco making up a dilute suspension was drawn from mixing receptacle 8 and metered into one end of the microcrystallizer 20 by the positive displacement pump 18 at the rate of about 111.35 pounds per minute.

The dilute suspension was passed through the microcrystallizer 20 in a helical path and discharged at the opposite end thereof at a uniform rate of flow. While in the microcrystallizer 20, the suspension was intensively agitated by the rotating mass of balls 30 which contributed to the rapid dissolution of the stucco and additive and promoted nucleation and formation of ultrafine crystals of calcium sulfate dihydrate. The resulting aqueous suspension of ultrafine crystals was discharged from the microcrystallizer into the gauging water line 34. In the line 34 the dilute aqueous suspension of ultrafine dihydrate crystals joined with the gauging water from the tank 36 and was passed through the positive displacement pump 42, the electromagnetic flow meter 16 and through the three-way diverter valve 44 to the mixer manifold 38. The mixer manifold 38 was located on and supplied water to the main gypsum board slurry mixer. (Not shown.) Subsequent blending of the water from mixer manifold 38 with the main stream of dry stucco and additive in the gypsum board slurry mixer distributed the accelerating dihydrate crystals uniformly throughout the resulting gypsum board slurry mass.

In the foregoing example, the amount of stucco used to form crystals of dihydrate for acceleration was 7.46 pounds per thousand square feet and the amount of ammonium sulfate additive was 0.625 pound per thousand square feet. These amounts produce a satisfactory setting action, and it was not necessary to vary the stucco from the normal 3.1 pounds per minute. In the above example, feeder mechanism 5 was adjusted so as to feed 2.5 pounds per minute of ancillary accelerator additive from hopper 4 for the first five minutes of operation and was automatically adjusted to revert to 0.25 pounds per minute thereafter. The first five minutes of operation in which the water and suspension were diverted to the drain was called the "dosing" period and was utilized in order to promote rapid initial nucleation in the microcrystallizer 20 and to minimize the time required to achieve an optimum concentration of accelerator crystals; or put it another way, the time was used to bring the microcrystallizer to equilibrium conditions prior to starting the board making process.

The microcrystallizer 20, in the above example, was about 14 feet long, and the container 22 had a 14-inch inside diameter. The shaft 24, extending through the microcrystallizer container 20 was about 8 inches in diameter, and the impeller bars 28 extending from the outer periphery of shaft 24 were backwardly sloped and extended radially in the order of 1 inch from the outer periphery of the shaft 24. Container 22 was loaded with 2,750 pounds of ½-inch steel balls each having a diameter of about ½ inch, and the power means 26 used to turn shaft 24 was a 40 hp. electric motor. The shaft was rotated at a speed of about 110 revolutions per minute.

It is not necessary that there be an additive accelerator compound utilized by this invention; however, the microcrystallizer 20 can be made of considerably smaller size, i.e., in the order of 40% smaller, if an additive is used. Thus, the preferred method would include the use of an accelerator additive. Also, although the aqueous suspension of ultrafine crystals was added to the gauging water in the example, there is no reason why the aqueous suspension could not be added directly to the slurry mixer 38. The example shows the suspension added to the gauging water because it is deemed the preferred means of practicing the invention.

It may be noted that the optimum efficiency of our method of making ultrafine crystals of calcium sulfate dihydrate can be obtained only by taking into consideration a number of variables. The specific apparatus used to practice our method is, of course, varied in size to meet specific conditions, as above mentioned. An important variable is the available water supply, which may contain a great deal of organic and/or inorganic impurities. Certain impurities in the water may vary the efficiency of production of the desired ultrafine calcium sulfate dihydrate crystals within the microcrystallizer 20. Another variable is the stucco itself. It is very difficult to find two sources of gypsum stucco that are identical in susceptibility to acceleration. Thus, the nature of the stucco must be taken into consideration when one is considering the use of this invention, and it is extremely difficult to generalize when referring to stucco.

When using the ultrafine crystals of this invention as an accelerator for a slurry in which calcined gypsum is the predominant solid material, the stucco used to make the ultrafine crystals may be as little as 1/10% of the weight of the solids in the slurry to which the accelerator is added; however, it is generally between ⅛% and ¾%, and is preferably about ½%. The accelerator should, however, not exceed 3% of the solids in the slurry used to make the gypsum product.

The amount of water that is generally added to the stucco used to make ultrafine crystals may also vary within an extremely large range. The water is always in excess of ten times the weight of the stucco and may vary from a ratio of above 10 to 1, i.e., more than 10 parts water to 1 part stucco, to about 330 to 1 ratio or more. In a preferred embodiment of our method, the quantity of water is in excess of a 20 to 1 ratio with the stucco and rarely to exceed 80 to 1 ratio with the stucco. When an accelerator compound is used, it is generally in the order of 1/10 of the weight of the stucco used to make the ultrafine crystals. This amount will, of course, vary somewhat in each individual case.

Due to the basic nature of this invention, it is adaptable to any situation involving the use of setting slurries made of plaster of Paris or stucco. The variables above mentioned are given in an attempt to show how optimum efficiency may be gained by the use of the invention. It may be necessary in given instances to make allowance for specific problems that reside in a certain given location.

This invention has been described by referring to the use of ultrafine crystals as an accelerator for setting slurries of plaster of Paris or stucco; however, it is believed that ultrafine calcium sulfate dihydrate crystals may have many uses. For example, the extremely fine crystals may serve as fillers for paints, insecticides, diluents, plastics, inks, etc. Also, the ultrafine crystals may be useful in other fiields; however, it is difficult to speculate because the crystals were developed as an accelerator for setting slurries of plaster and/or stucco.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. Method for effecting rapid setting of a calcined gypsum slurry which comprises:
    (a) continuously forming a suspension of calcium sulfate hemihydrate in from about 20 to 80 parts of water per part of hemihydrate;
    (b) continuously feeding said suspension into a stationary chamber substantially filled with freely movable steel balls, said suspension substantially filling void spaces between the balls;
    (c) causing relative movement of said balls by means of a movable agitator in said chamber;
    (d) progressively advancing said suspension through said chamber in a tortuous path while subdividing the suspension and subjecting it to agitation and impact by said balls, whereby to effect the formation of ultrafine calcium sulfate dihydrate crystals in suspension;
    (e) continuously withdrawing the thus formed suspension from said chamber; and
    (f) incorporating the thus formed suspension in a calcined gypsum slurry.

2. In a process for manufacture of a quick setting water slurry of calcined gypsum wherein an aqueous calcium sulfate hemihydrate slurry is mixed with accelerator, the improvement which comprises adding as accelerator from about 1/10 to about 3% solids basis of an aqueous suspension of ultrafine calcium sulfate dihydrate crystals prepared by the method comprising:
    (a) continuously forming a suspension of calcium sulfate hemihydrate in about 20 to about 80 parts of water per part of hemihydrate;
    (b) continuously feeding said suspension into a chamber substantially filled with movable elements, said suspension substantially filling the void spaces between said elements;
    (c) effecting relative movement of said elements;
    (d) progressively advancing said suspension through said chamber in a tortuous path while subdividing and impacting the same by means of said movement of said elements; and
    (e) continuously withdrawing the thus formed aqueous suspension of ultrafine calcium sulfate dihydrate crystals.

3. Method of forming suspended ultrafine calcium sulfate dihydrate crystals which comprises:
    (a) continuously suspending calcium sulfate hemihydrate in from about 20 to 80 parts of water per part of hemihydrate;
    (b) continuously feeding the suspension into a stationary chamber substantially filled with freely movable elements, said suspension substantially filling the void spaces between said elements;
    (c) causing relative movement of said elements by means of an agitator in said chamber;
    (d) progressively advancing said suspension through said chamber in a tortuous path while subdividing the same and subjecting it to agitation and impact by said movable elements, whereby to effect the formation of a suspension of ultrafine calcium sulfate dihydrate crystals; and
    (e) continuously withdrawing the thus formed suspension from said chamber.

References Cited by the Examiner
UNITED STATES PATENTS

| | | | |
|---|---|---|---|
| 304,615 | 9/1884 | Church | 106—110 |
| 1,600,552 | 9/1926 | Makowski | 106—110 |
| 1,909,465 | 5/1933 | Hansen et al. | 106—110 |
| 2,038,072 | 4/1936 | Wilson | 23—122 |
| 2,177,254 | 10/1939 | Heckert | 23—122 |
| 2,341,426 | 2/1944 | Dailey | 106—110 |
| 2,616,789 | 11/1952 | Hoggatt | 23—122 |
| 2,770,533 | 11/1956 | Kahmann et al. | 23—273 |
| 2,813,778 | 11/1957 | Tidwell | 23—122 |
| 2,820,714 | 1/1958 | Schneiter et al. | 106—110 |
| 2,845,337 | 7/1958 | Myers | 23—300 |
| 2,846,292 | 8/1958 | Harper | 23—273 |
| 2,871,134 | 1/1959 | Loechl | 106—110 |
| 2,954,282 | 9/1960 | Bauer et al. | 23—300 |

OSCAR R. VERTIZ, *Primary Examiner.*

JOSEPH REBOLD, JOHN R. SPECK, MAURICE A. BRINDISI, *Examiners.*

D. J. ARNOLD, E. C. THOMAS, *Assistant Examiners.*